United States Patent [19]

Uhlig

[11] 4,070,429
[45] Jan. 24, 1978

[54] METHOD FOR FORMING A BLOWN PLASTIC CONTAINER

[75] Inventor: Albert R. Uhlig, Toledo, Ohio

[73] Assignee: Owens-Illinois, Inc., Toledo, Ohio

[21] Appl. No.: 735,554

[22] Filed: Oct. 26, 1976

[51] Int. Cl.$^2$ .................. B29C 17/07; B29C 17/10
[52] U.S. Cl. .................................. 264/89; 264/97;
264/98; 264/154; 264/155; 264/159; 264/163;
264/296; 425/290; 425/527; 425/530
[58] Field of Search .................. 264/89, 94, 96, 97,
264/98, 99, 296, 163, 154–156, 157, 159;
425/290, 296, 302 B, DIG. 204, DIG. 212,
DIG. 214, DIG. 215

[56] References Cited

U.S. PATENT DOCUMENTS

| 3,337,911 | 8/1967 | Di Settembrini | 264/98 X |
| 3,338,998 | 8/1967 | Di Settembrini | 264/94 |
| 3,492,106 | 1/1970 | Peters et al. | 264/94 X |
| 3,754,851 | 8/1973 | Reilly et al. | 264/98 X |

*Primary Examiner*—Jan H. Silbaugh

*Attorney, Agent, or Firm*—Richard D. Heberling

[57] ABSTRACT

A method is disclosed for forming a plastic container by a blow molding operation. In the method, a tubular thermoplastic parison is blown to a preform within a first mold by a blow pipe inserted into one axial open end of the parison. Prior to removing the preform from the first mold, a secondary opening is formed in the wall of the preform, either by a spike-shaped piercing surface over which the parison is expanded or by a vent port through which blow air is exhausted to rupture an opening in the preform wall. The preform is then transferred to a second mold, which pinches shut the initial blowing opening of the preform. A second blow pin is inserted into the secondary opening to supply blow air under pressure to expand the preform to a container. The secondary opening may be formed into a finish opening on the container during the second blow molding operation, thus enabling the finish opening to be located at a position remote from the position on the container which corresponds to an axial extremity on the original tubular parison.

12 Claims, 15 Drawing Figures

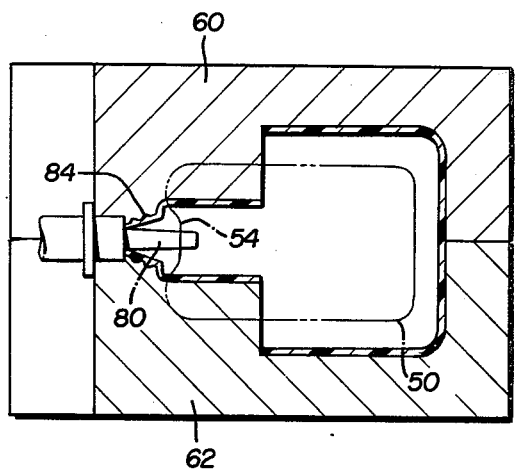
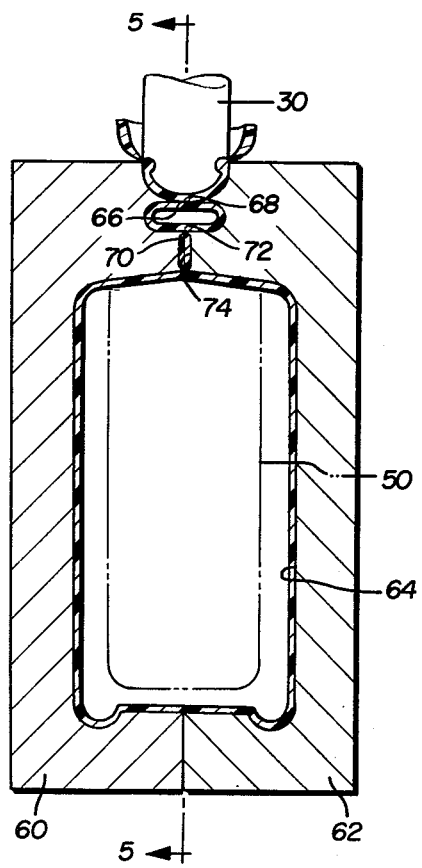
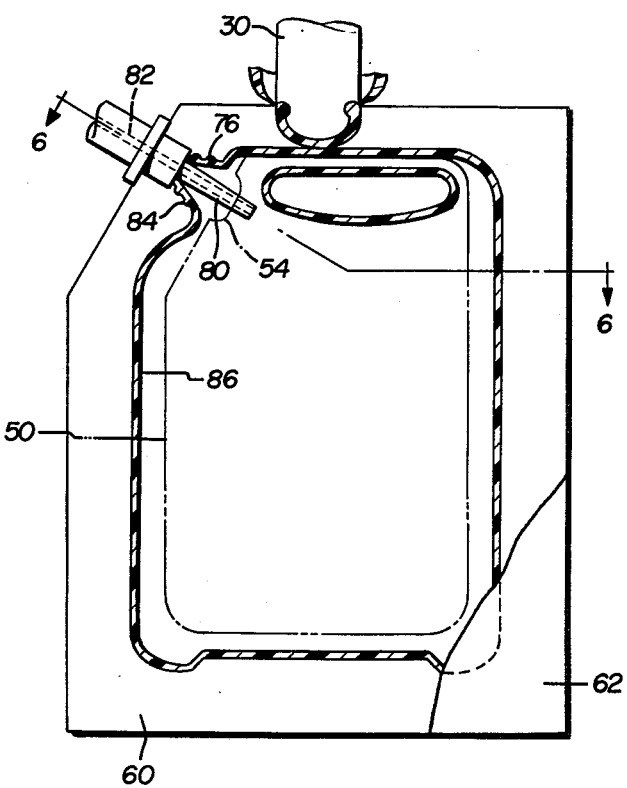
FIG. 6
FIG. 4
FIG. 5

METHOD FOR FORMING A BLOWN PLASTIC CONTAINER

BACKGROUND OF THE INVENTION

The present disclosure relates generally to a method for forming a blown thermoplastic container, and more specifically in one embodiment to a "blow-and-blow" operation where a secondary opening is formed in a preform during the first blowing operation and then blow air is introduced through the secondary opening in the final blowing operation.

General blow molding techniques are well-established in the prior art, including both "single-blow" operations and "blow-and-blow" operations. An example of the "blow-and-blow" operation is disclosed in the U.S. Pat. No. 3,767,747, which is incorporated by reference.

One method of forming a blown plastic article according to the prior art includes inserting a blow pipe into one end of a parison which is enclosed within a blow mold cavity. Blow air under pressure is then introduced into the parison through the blow pipe to inflate the parison into the configuration of the desired article. This results in a blown article having an opening generally at the center of one of its axial ends.

When it has been desireable to form an opening in a blown plastic article at a position which corresponds to something other than an axial extremity of the article, it has been the general practice in the prior art to cut and trim the article in an operation subsequent to blow molding. This, obviously, presents the problems and disadvantages of additional and undesireable handling, equipment, time and expense.

SUMMARY OF THE INVENTION

The present invention over comes the prior art problems by a method and apparatus whereby an opening may be formed at an intermediate position of the article during the blow molding operation.

In one aspect of the disclosed method, a blowable plastic shape, such as a parison or preform, is enclosed within a blow mold cavity by the closure of the sections of a blow mold. Next, pressurized blow air is introduced into the plastic shape to form the blown plastic article. While the blown plastic article is within the blow mold cavity, an opening is formed in its side wall portion. This may be achieved, in one embodiment, by expanding the blowable shape during the blow molding operation against a prong-shaped piercing surface. In a second disclosed embodiment, the blow mold includes a vent port which is closed to atmosphere during the blowing operation. Immediately after the blowing operation, the vent port is exposed to atmosphere, permitting the pressurized blow air within the blown article to rupture a portion of the blown article and form the desired opening.

The disclosed method is also advantageously employed in a "blow-and-blow" operation. In this aspect of the invention, blow air under pressure is introduced into a tubular thermoplastic parison to expand the parison to a preform configuration. Next, an opening is formed in the wall of the preform at a position other than that where the air under pressure is introduced. The preform with the formed opening is then enclosed within a blow mold cavity, where additional blow air is introduced through the formed opening to expand the preform into a final article. In a more limited aspect, the original introduction of blow air into the parison is by way of a blow pin inserted into an opening at one axial parison extremity, which is pinched shut when the preform is placed within the blow mold cavity.

A very specific application for this invention is for forming a finish opening in a blown container, where the finish opening is positioned at a side of the container, or off-center at the top of the container. The resultant freedom of container design will be appreciated, since it is no longer necessary to blow twice through the same blow opening. In order to assure that the finish opening is not unduly thinned, the region in the preform which circumscribes the formed opening may be formed with a concave configuration that is thicker than the surrounding blown preform wall portions. The concave region is then blown into the finish forming cavity in the final blow mold, having a thickness substantially the same as that portion of the article immediately adjacent the finish formation.

In an alternative embodiment, the method may be utilized to form a plurality of blown containers. In this embodiment, the preform is blown within a first blow mold cavity having a plurality of side by side, interconnected primary cavities. The blown preform is then transferred to a final molding station, where portions of the blown preform are pinched together for the formation of the plurality of containers.

In another disclosed embodiment, the blown preform and final article have a configuration of an elongated capsule-shape with an intermediate, radially outwardly directed annular plastic ring. After the final blow molding step, a portion of the annular plastic ring is cut off, leaving two separate containers formed from one single plastic parison.

Accordingly, the present invention provides at least the following advantages: (1) the ability to easily, efficiently, and cheaply form openings in blown containers at off-centered positions relative to the axial extremity of the plastic article; (2) the elimination of cutting and trimming operations separate and apart from the blow molding operation; (3) the ability to form openings in the side wall of a container, without sacrifices in cycle time; and (4) the capability of forming containers of unusual shapes, as where the dispensing opening is located off-center, etc.

Other meritorious features and advantages will become apparent from the following disclosure and appended claims.

BRIEF DESCRIPTION OF THE DRAWINGS

FIG. 4 is a schematic front elevational view of a final blow molding cavity where the preform is blown to the configuration of the final article.

FIG. 5 is a schematic side elevational view taken along plane 5—5 of FIG. 4, illustrating the manner of inserting a blow pin within the opening formed in the preform during the preform molding operation.

FIG. 6 is a schematic view taken along plane 6—6 of FIG. 5.

DETAILED DESCRIPTION OF THE DISCLOSED EMBODIMENTS

The present disclosure relates to a method and apparatus for forming openings in the side wall of blown plastic containers. Three separate embodiments are disclosed in FIGS. 1–6, FIGS. 7–10 and FIGS. 11–15.

THE EMBODIMENT OF FIGS. 1–6

Figure 3:
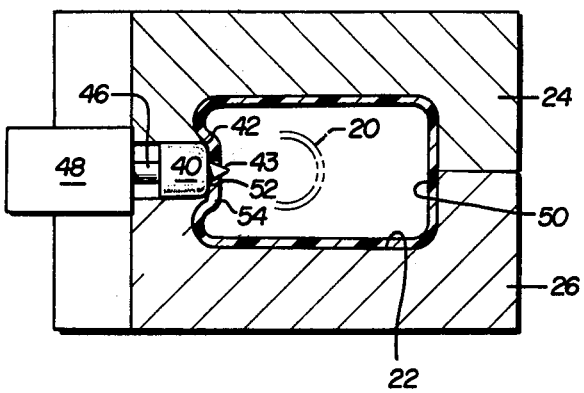
FIG. 3 is a schematic view taken along plane 3—3, as indicated in FIG. 2.
Figure 1:
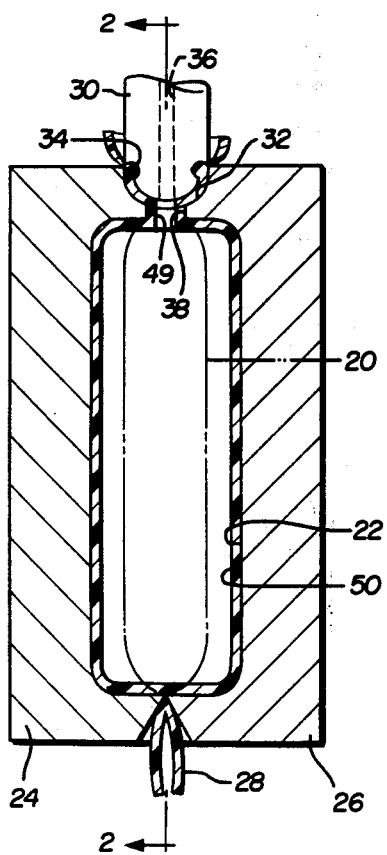
FIG. 1 is a schematic front elevational view of a preform blow mold.
Figure 2:
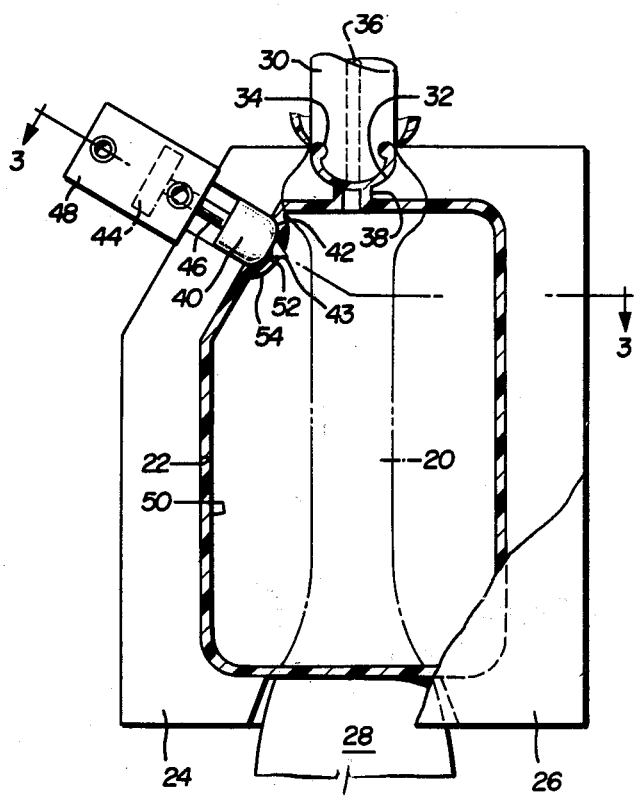
FIG. 2 is a schematic side elevational view taken along plane 2—2 of FIG. 1, illustrating a piercing mechanism for forming an opening in a blown preform according to the present invention.

Referring to FIGS. 1–3, a blowable thermoplastic parison 20 is illustrated as enclosed within a blow mold cavity 22 defined by a pair of blow mold sections 24 and 26. The parison may be formed by conventional free extrusion or injection molding, techniques, the illustrated parison 20 being of the free-extrusion type and therefore mold sections 24 and 26 have pinched the parison shut at its bottom to form a tail 28. Conventional tail pullers (not shown) may be utilized at the preform molding station to remove the tail 28 from the remainder of the plastic materal while mold halves 24 and 26 are shut.

An axially reciprocable and laterally moveable blow and transfer pin 30 is received within a concave region 32 cooperatively defined by the two preform mold halves 24 and 26. The blow pin includes an annular groove 34, which receives waste plastic material to enable a blown preform to be conveyed on the pin 30. An axial air supply port extends through blow pin 30 and is interconnected with a supply of blow air under pressure. Additionally, the supply port 36 is in axial alignment with an opening 38 defined by the blow mold halves, opening 38 communicating with the interior of the blow mold cavity to facilitate the introduction of pressurized blow air into parison 20.

To form an opening in the side wall of the preform, a piercing mechanism is secured to one of the blow mold halves and includes an axially reciprocable rupture pin 40, having a spike 43 circumscribed by a convex domed surface 42. The axial reciprocal movement of the rupture pin 40 is effected by a hydraulic cylinder 48 which houses a piston 44 that is interconnected to the rupture pin 40 by a piston rod 46.

The molding operation at the preform mold station is carried out as follows: First, a blowable thermoplastic parison 20 is positioned, for example by downward extrusion, between the open blow mold sections 24 and 26, which are then closed on the parison to pinch shut the parison bottom. Next, blow pin 30 is axially moved downwardly into the position as shown in FIGS. 1 and 2, pinching an upper portion of the parison to force plastic material into groove 34. Prior to the actual blow molding operation, the rupture pin is moved to the position as illustrated in FIG. 2. Blow air under pressure, for example at about 100 PSI, is then introduced through port 36 and an opening 49 in the plastic material to radially inflate the parison outwardly into engagement with the mold wall surfaces, forming a preform 50. During expansion of the plastic material, a portion of the parison is expanded onto spike 43, forming an opening 52 in the preform. The material circumscribing the opening 52 expands onto the convex surface 42 to form a concave preform portion 54. This concave section is thicker and hotter than the immediately surrounding preform portions, in accordance with Applicant's pending application Ser. No. 566,016, now U. S. Pat. No. 3,989,784, incorporated by reference.

After the blowing operation, rupture pin 40 is retracted by cylinder 48 to provide clearance for removal of the preform from the mold. Next, mold halves 24 and 26 are opened, by conventional hydraulic means (not shown), leaving the preform suspended from blow pipe 30 by the waste material extending into the annular groove 34.

Next, the blow pipe 30 is laterally displaced to a subsequent molding station, which is illustrated by FIGS. 4–6. The mold at the subsequent or final blow molding station is comprised of mold halves 60 and 62, which cooperatively define an internal blow mold cavity 64. The mold halves include pinching surfaces 66 and 68 which register with the opening 49 in the preform to pinch that opening shut, as illustrated. Additionally, the mold halves include pinching surfaces 70 and 72 which cooperate to define a recess 74 to form a handle in the final article.

Referring more specifically to FIG. 5, an axially reciprocal blow pin 80 is illustrated in co-axial arrangement with a finish defining cavity region 76 of the blow mold. An air delivery port 82 extends through the blow pin 80 to supply pressurized blow air through preform opening 52 to inflate the preform into the final container 86.

The method at the final molding station includes, first, closing mold sections 60 and 62 onto the preform 50 which is suspended from blow pipe 30. Closure of the molds results in (1) pinching preform opening 49 shut by pinching surfaces 66 and 68 and (2) pinching an upper portion of the preform shut by surfaces 70 and 72 to form a handle opening for the final container. Next, the axially reciprocal blow pin is inserted into the preform opening 52 for the delivery of blow air under pressure into the preform. The blowing operation results in an expansion of the preform into the final container configuration 86, and includes expanding concave preform region 54 outwardly into convex finish region 76 to form a finish 84. In accordance with the invention, the finish portion 84 has a thickness substantially the same as the immediately adjacent, surrounding preform portions, as more fully explained in Applicant's copending application, Ser. No. 566,016. Additionally the blowing operation at the second blow mold may be practiced to achieve molecular orientation of the plastic material, as more fully set forth in Applicant's U.S. Pat. No. 3,767,747, incorporated by reference.

Subsequent to the blow molding operation, the axially reciprocal blow pin 80 is displaced from the mold halves, which are then opened, leaving the blown container 86 suspended from blow pipe 30. The blow pipe can then be displaced to an unloading station, where the container is separated from the waste plastic material. Then, the blow pin will be laterally conveyed back into alignment with a preform mold cavity for the subsequent formation of another blown container.

THE EMBODIMENT OF FIGS. 7-10

Figure 7:
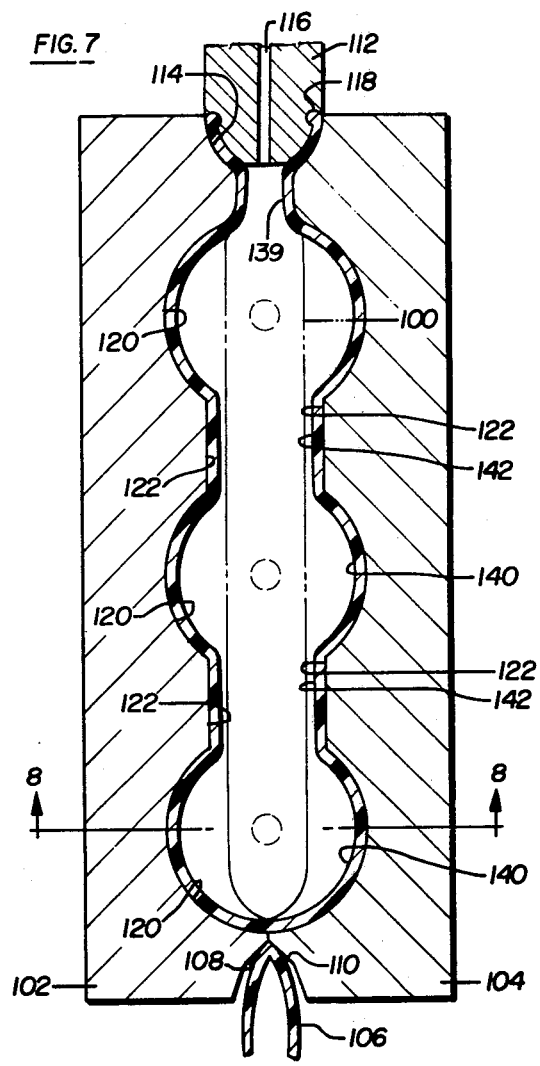
FIG. 7 is a schematic side elevational view of a preform mold in a second embodiment of the disclosed invention.
Figure 8:
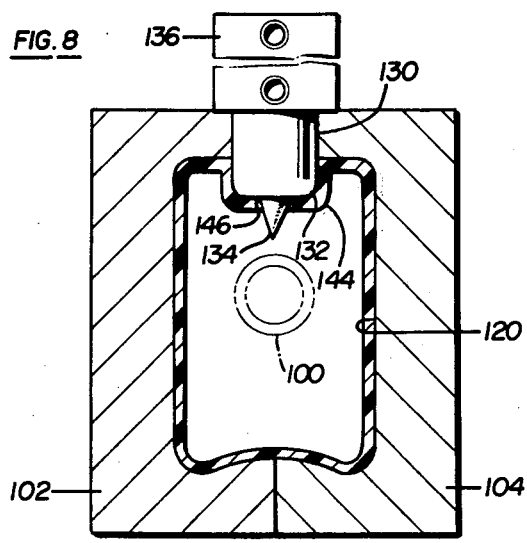
FIG. 8 is a schematic view taken along plane 8—8 as indicated in FIG. 7.

Referring to FIGS. 7 and 8, an elongated tubular thermoplastic parison 100 is illustrated in a mold cavity defined by preform mold half sections 102 and 104, including pinching surfaces 108 and 110 which have formed a tail 106 on the parison. A blow pipe 112 is illustrated as being positioned within a concave region 114 defined by the mold halves, the blow pipe including an air delivery port 116 and an annular groove 118 to receive waste material.

A mold cavity cooperatively defined by the mold halves 102 and 104 includes a plurality of elongated major cavities 120, generally taking the form of a container and being spaced by opposed flats or lands 122. Fig. 8 illustrates that an axially reciprocable rupture pin 130 is provided for each major cavity 122, the rupture pin including a convex dome-shaped surface 132 and a piercing point 134. In the same manner as discussed in regard to the embodiment of FIGS. 1-6, the each rupture pin is reciprocated by a hydraulic cylinder 136.

The operation at the molding station of FIGS. 7 and 8 includes, first, positioning a parison 100 between opened mold sections, 102 and 104 which are then closed onto the parison. Blow pin 112 is then reciprocated downwardly into the open end 114 of the parison to commence the blow molding operation. Pressurized blow air is delivered into the parison by way of air delivery port 116 and through opening 139 in the plastic parison, causing the plastic material to expand (1) to form a plurality of perform segments 140 destined to form the individual final containers, (2) to form plastic bridging segments 142, interconnecting segments 140, (3) to cause plastic material to expand onto and over piercing points 134 of the rupture pins, forming openings 146, and (4) to form concave preform segments 144 on the convex surface 132 of the rupture pins.

After blowing, the rupture pins 130 are retracted by hydraulic cylinders 136 and blow mold halves 102 and 104 are separated by conventional hydraulic means (not shown) leaving the blown preform suspended from blow pipe 112.

Figure 9:
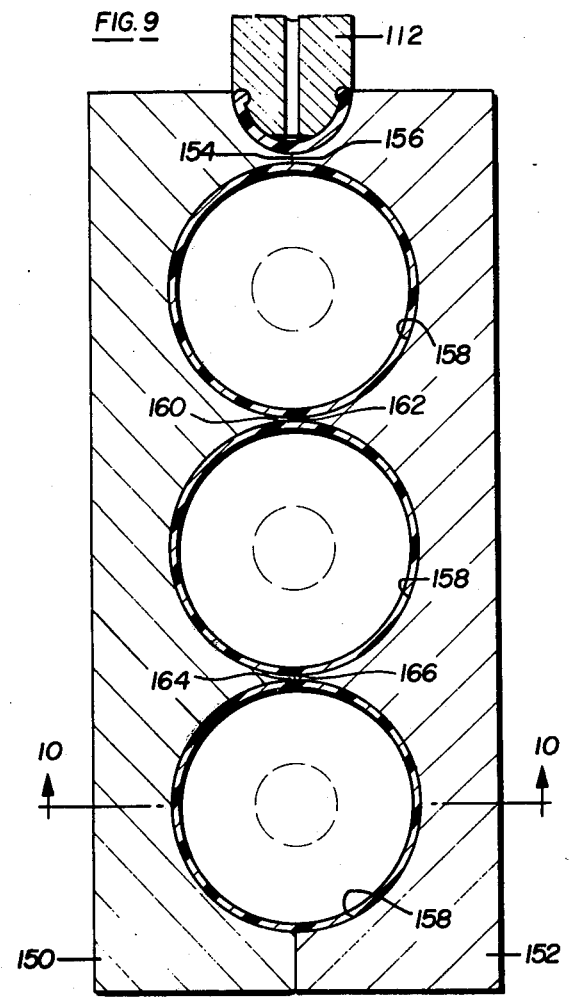
FIG. 9 is a schematic side elevational view of a final blow molding cavity of the second embodiment.
Figure 10:
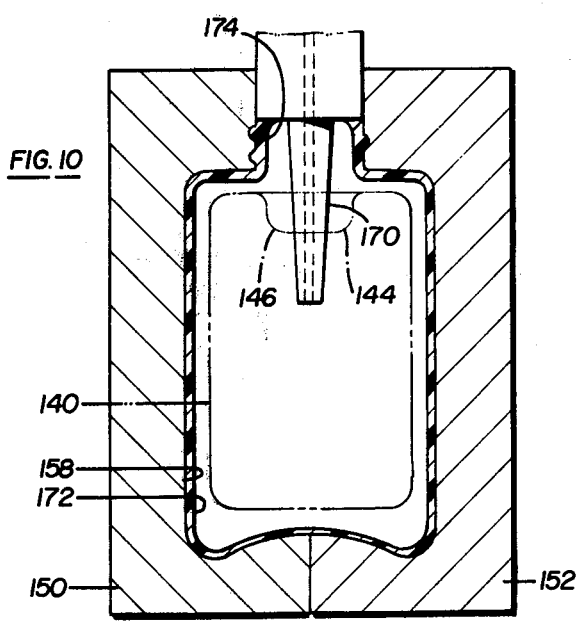
FIG. 10 is a schematic view taken along plane 10—10, as indicated in FIG. 9, again indicating the manner of inserting a blow pin in an opening formed in the preform.

The blow pipe with suspended preform is then displaced to a final molding station illustrated by FIGS. 9 and 10, where a final mold is comprised of section halves 150 and 152 which include pinching surfaces 154 and 156 to engage and close the opening 139 in the preform. The mold halves cooperatively define separate container cavities 158 which are separated by opposed pairs of pinching surfaces 160, 162, 164 and 166, which engage and seal the preform bridge sections 142 during mold closure.

FIG. 10 illustrates that an axially reciprocable blow pin 170 is provided for each mold cavity 158. These blow pins are in registry with each of the openings 146 in the preform in a manner similar to that of the embodiment in FIGS. 1-6.

The method of operation at the final blow mold includes, first, closing the mold halves 150 and 152 onto the preform. During mold closure, pinching surfaces 154 and 156 close previously existing opening 139 in the preform; and the opposed pairs of pinching surfaces 160-162 and 164-166 engage preform bridge segments 142 to pinch shut and weld the plastic material together for the formation of individual containers.

After mold closure, blow pins 170 are displaced to the position illustrated in FIG. 10. The introduction of blow air through the blow pins expands the preform segments 142 into individual containers 172 including finish 174 formed from concave preform region 144. As discussed in connection with the embodiment of FIGS. 1-6, finish 174 will be substantially as thick as the surrounding nonconvex container portions. After blowing, blow pins 170 are retracted and blow mold halves 150 and 512 are opened, leaving the tandem, attached containers 172 suspended from blow pin 112. The individual containers may then be separated along the pinched lines or utilized in combination, as desired.

THE EMBODIMENT OF FIGS. 11-15

The embodiment disclosed in these figures relates to a combination for making two "wide mouth" containers from a single plastic parison.

Figure 11:
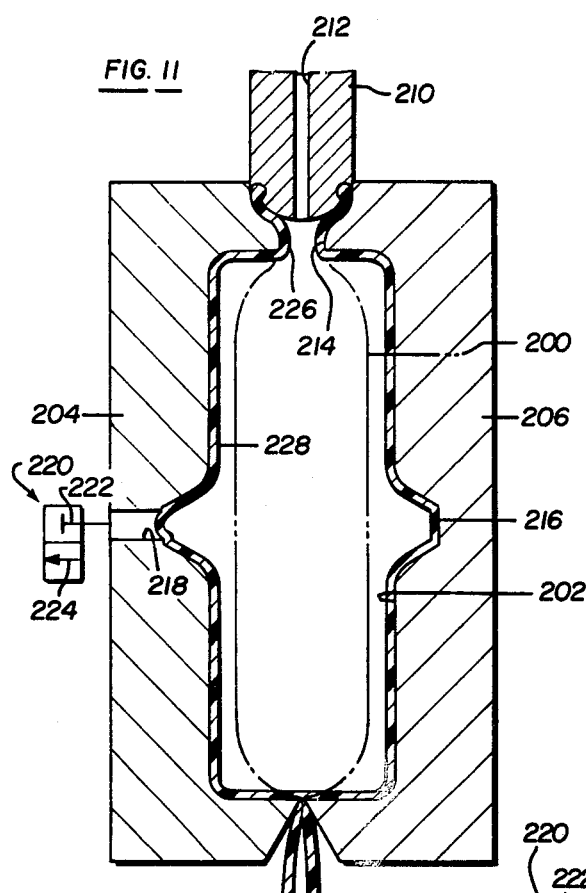
FIG. 11 is a schematic side elevational view of a third disclosed embodiment, illustrating a preform mold.

In FIG. 11, a parison 200 is illustrated in a blow mold cavity 202 which is defined by closed preform mold halves 204 and 206. The mold cavity includes an annular concave ring portion 216 to form a correspondingly shaped configuration on the preform. An axially reciprocable blow pipe 210 including an air supply port 212 registers with a mold opening 214 for the supply of blow air.

In this embodiment, an alternative means is disclosed for forming an opening in the side wall of the preform. This alternative means includes a vent port 218 which may be opened and closed to atmosphere by way of a two position valve 220, including a closed branch line 222 and a through or open branch line 224.

The blow molding operation at the position of FIG. 11 proceeds as follows. First, the blow mold halves 204 and 206 are closed on parison 200, pinching shut the bottom of the parison and forming an opening 226 at the top of the parison. The axially reciprocable blow pipe 210 is then lowered into position in alignment with mold opening 214. Immediately subsequent to lowering of the blow pipe 210, blow air under pressure is delivered through port 212 and through preform opening 226 to inflate the parison into the configuration of mold cavity 202. During the blow molding operation, valve 220 is positioned as illustrated in FIG. 11 to prevent escape of any blow air. Accordingly, preform plastic material covers vent port 218.

Figure 12:
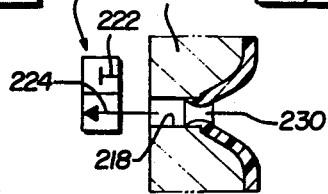
FIG. 12 is a fragmented side elevational view of the opening forming operation in the preform mold shown in FIG. 11.
Figure 14:
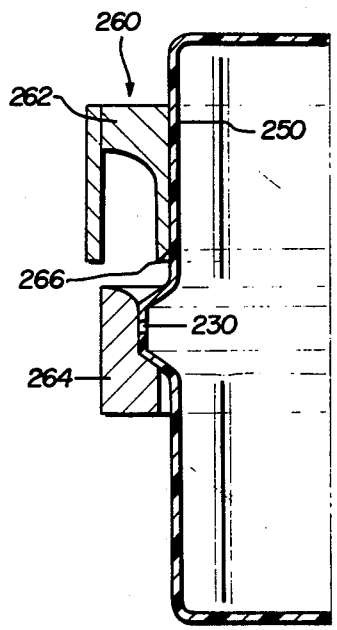
FIG. 14 is a schematic side elevational view of a die cutting operation used in conjunction with the third embodiment to form two "wide-mouth" containers from the single blown container.

After blowing, but while the preform is pressurized by the blow air, valve 220 is switched to the position as illustrated in FIG. 12. That is, through branch line 224 is placed "in-line" with vent port 218, which is thereby placed in communication with atmosphere. As a result, the pressurized fluid inside the preform ruptures the plastic material at vent 218 to form an opening 230, and the pressurized fluid escapes through vent port 218 and through line 224 to atmosphere.

Figure 13:
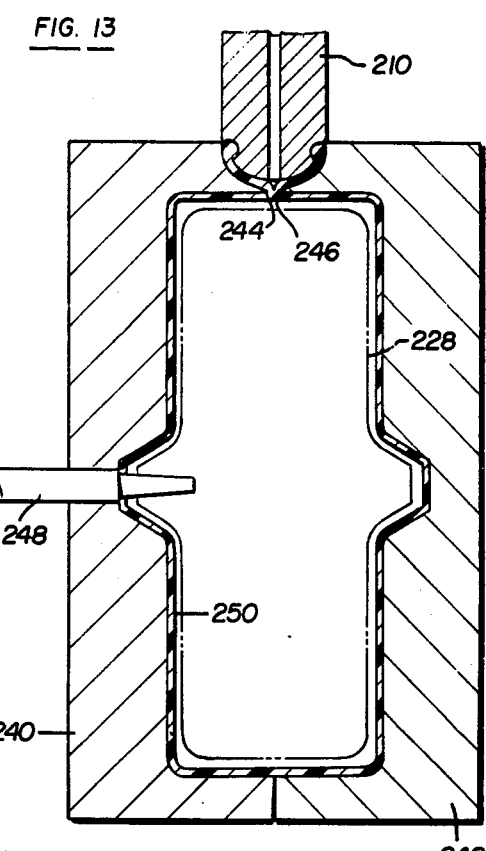
FIG. 13 is a schematic side elevational view of a final blow mold of the third embodiment.
Figure 15:
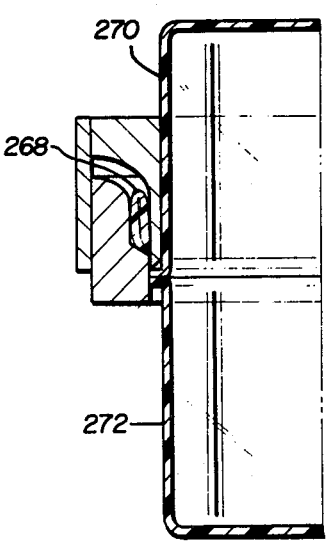
FIG. 15 is a schematic side elevational view similar to FIG. 14, and illustrating the terminal phases of the die cutting operation.

Subsequently, the blow mold halves 204 and 206 are opened and preform 228 is conveyed by blow pin 210 to a final blow molding station, illustrated by FIG. 13. The final blow mold is comprised of mold sections 240 and 242, which includes pinching surfaces 244 and 246 to engage and shut preform opening 226. A blow pin 248 may be rigidly connected to mold half 240 for registry with preform opening 230. After supplying blow air under pressure through blow pin 248 to form the final container 250, mold halves 240 and 242 are opened and the article 250 is placed within a shearing die 260, illustrated by FIGS. 14 and 15. The shearing die is comprised of upper and lower relatively moveable, annular die sections 262 and 264, respectively, as more fully disclosed in U.S. Pat. No. 3,711,233, incorporated by reference. The upper die section 262 includes an annular shearing edge 266, which severs the radially outward ring on article 250, as illustrated in FIG. 15, to form two wide mouth containers 270 and 272, such as beakers.

It is to be understood that the foregoing description of the present invention is exemplary in nature, rather than limiting. For example, the alternative opening forming means shown in FIGS. 11 and 12 may be used in conjucntion with a convex forming surface as discussed in connection with the embodiments of FIGS. 1-10. Additionally, the piercing pins shown in the embodiment of FIGS. 7-10 may be placed other than along the mold parting line. For example, the pins could be placed on the side of the mold parallel to the axis of reciprocation eliminating the requirement for separate hydraulic reciprocation equipment since the piercing pins would reciprocate with the mold.

Having therefore fully and completely disclosed my invention, I now claim:

1. In a method of forming a blown container, by the steps of introducing blow air under pressure into the open end of a thermoplastic parison as the parison is confined within a first mold cavity to form a blown preform, and then introducing blow air under pressure into the preform while in a second mold cavity to form the blown container, the improvement of forming an additional opening in said preform spaced from said open end of said parison during the blow molding operation and while the preform is confined in the first mold cavity, and then pinching shut the open end of the preform by mold sections of said second mold and injecting final blow air through said additional opening and into the preform while the preform is in the second mold cavity, to form a blown container having a dispensing opening defined by said additional opening.

2. The method as defined in claim 1, characterized by blowing the final article to a configuration of an elongated capsule-shape having an intermediate, radially outwardly directed annular ring; and further including the step of shearing at least a portion of the annular ring around its entire periphery to form two containers.

3. The method as defined in claim 1, characterized by introducing blow air into the parison in the first mold cavity through an opening at one axial parison extremity, and then pinching that opening shut by closure thereon with the second mold sections, prior to blowing the preform to the blown container.

4. In a method of forming a blown thermoplastic article, the steps of:
 1. introducing air under pressure through a first opening of an essentially tubular thermoplastic parison within a first mold cavity to expand the parison to a preform configuration intermediate that of the parison and the final article;
 2. while the preform is in the first mold cavity, forming a second opening in the wall of the preform at a position other than that at which the air under pressure is introduced in Step (1);
 3. closing said first opening in the preform;
 4. enclosing the preform within a second blow mold cavity having a size and shape of a final article; and
 5. introducing blow air under pressure into the preform through the second opening to expand the preform into the final article.

5. The method as defined in claim 4, characterized (a) by introducing air under pressure into the parison in Step (1) through an opening in one axial extremity of the tubular parison (b) and by closing said first opening by closing sections of said second mold thereon.

6. The method as defined in claim 4 characterized by forming said second opening in the wall of the preform by expanding a portion of the parison against a sharp piercing surface in the first mold cavity.

7. The method as defined in claim 4, characterized by forming said second opening in the wall of the preform by exposing an exterior wall surface portion of the preform to atmospheric pressure while the interior of the preform is pressurized by blow air, and rupturing said wall portion by the internal blow air pressure.

8. The method as defined in claim 4, further including the steps of forming the preform in Step (1) with a concave portion circumscribing the opening formed in Step (2), the concave preform portion having a thickness greater than the immediately adjacent non-concave preform portions; and inverting the concave preform portion in Step (5) to form a convex portion of a blown article.

9. The method as defined in claim 8, further characterized by said concave preform portion being hotter than the immediately adjacent, thinner non-concave portions and by forming said concave preform portion into a protuberant finish portion on the blown article.

10. A method of forming a blown plastic container by the steps of:
 1. closing the sections of a preform blow mold onto an elongated, essentially tubular blowable thermoplastic parison having an opening at one of its axial ends in alignment with a blow pin;
 2. introducing blow air under pressure into the parison through said axial end opening to expand the parison to a preform having the configuration of the mold cavity defined by the sections of the preform blow mold;
 3. during the performance of Step (2), expanding a portion of the thermoplastic preform material against a convex mold cavity surface to form a concave preform portion which is destined to form a convex portion of the blown plastic container;
 4. forming an opening through approximately the center of the concave preform portion while the preform is in the preform mold;
 5. removing the preform from the preform mold;
 6. closing the sections of a final mold on the preform to pinch shut said axial end opening;
 7. inserting a blow pin through the opening in the concave parison portion and introducing blow air under pressure through said blow pin (a) to expand the preform to the configuration of the cavity defined by the closed sections of the final mold and (b) to invert the concave preform portion into a convex container portion having a thickness substantially the same as the immediately adjacent container portion.

11. The method as defined in claim 10, characterized in Step (7) by expanding the concave preform portion into a finish defining cavity portion of the container mold.

12. A method for forming a plurality of blown containers from a single tubular parison of thermoplastic material, comprising the steps of:
1. enclosing an essentially tubular, elongated blowable plastic parison within a preform mold having a plurality of interconnected, major, elongated cavities generally perpendicular to the longitudinal axis of the parison;
2. introducing blow air under pressure into the parison through an opening at one axial parison extremity and forming a preform by expanding the parison into the major cavities and against mold portions interconnecting those cavities, forming a plurality of preform segments (a) destined to form individual containers and (b) interconnected by integral, opposed pairs of joining portions;
3. while the preform mold is closed, forming an opening in the wall of each preform segment destined to form an individual container;
4. removing the preform from the preform mold;
5. closing the sections of a final blow mold on the preform (a) to pinch shut said opening at the one axial parison extremity, (b) to pinch shut and weld together portions of the corresponding, opposed joining portions and (c) to enclose each of the preform segments within an individual blow cavity; and
6. forming a plurality of individual blown containers by introducing blow air under pressure into each preform segment through that opening formed in the wall thereof by the performance of step (3).

* * * * *